March 22, 1949. F. D. WARBURTON 2,464,952
VEHICLE

Filed Jan. 7, 1946 2 Sheets-Sheet 1

Inventor
Frank D. Warburton
By Mason & Graham
Attys.

March 22, 1949. F. D. WARBURTON 2,464,952
VEHICLE
Filed Jan. 7, 1946 2 Sheets-Sheet 2
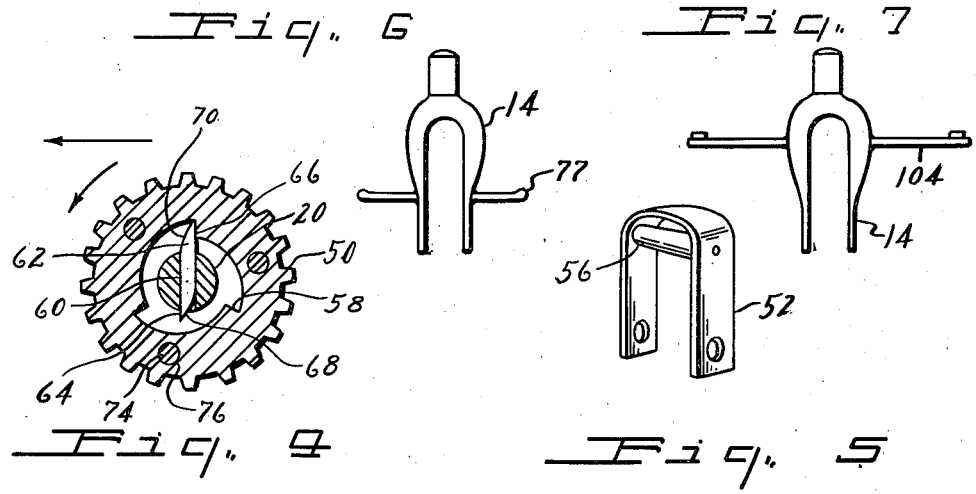
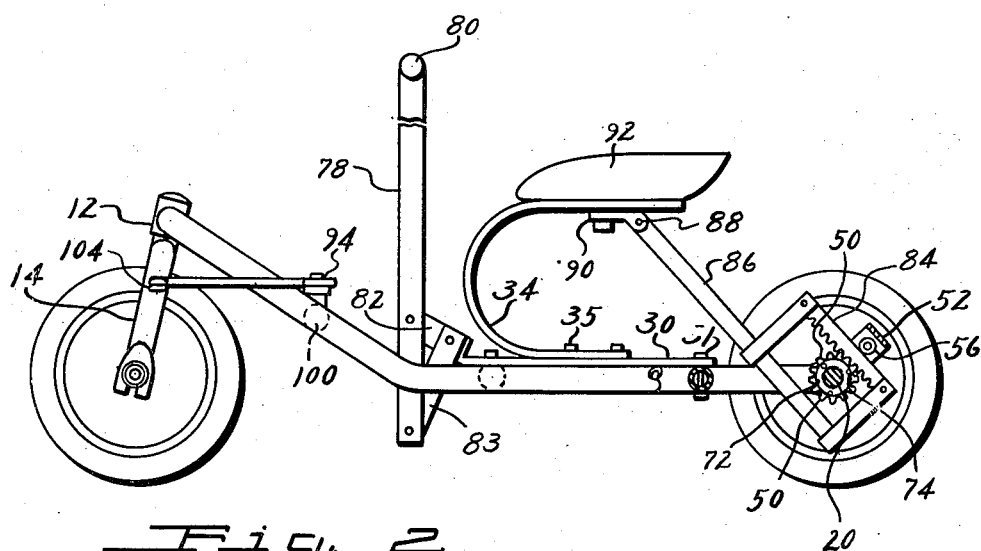
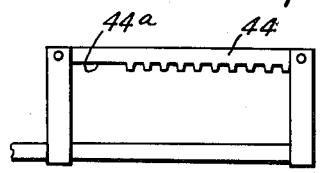
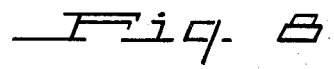
Inventor
Frank D. Warburton
By Mason & Graham
Attys.

Patented Mar. 22, 1949

2,464,952

UNITED STATES PATENT OFFICE 2,464,952

VEHICLE

Frank D. Warburton, South Gate, Calif.

Application January 7, 1946, Serial No. 639,571

2 Claims. (Cl. 280—225)

This invention relates to vehicles of the tricycle type, and is particularly described hereinafter as incorporated in a self-propelled vehicle designed for use as a child's tricycle, although the invention is not necessarily limited to such use.

In self-propelled vehicles for children, it is well to provide a simple but sturdy mechanism easy to operate and capable of withstanding much abuse, and it is desirable to arrange the vehicle so that it provides amusement for the child. It is of decided benefit to the child if the vehicle can be so constructed that its use provides exercise for the muscles of the child's body. A general object of the invention is to provide a vehicle having the above characteristics.

While various forms of self-propelled vehicles for children are known, they are, in many instances, either too difficult to operate to afford enjoyment to younger children, or are complicated and easily put out of order.

It is an object of the invention to provide a self-propelled vehicle of this character capable of being propelled by effecting propulsion of the vehicle by a body movement providing desirable exercise.

A further object of the invention is to provide a simple mechanism for causing rotation of a shaft, which mechanism is practically troubleproof.

A further object of the invention is to provide a mechanism for operating vehicles of the kind described which is easy to operate.

Still further objects and features of the invention will appear in the following description taken in conjunction with the accompanying drawings.

The invention is hereinafter described and illustrated in preferred forms, but it is to be understood that the scope of the invention is not in any way limited by this illustrative showing but only as indicated by the scope of the appended claims.

In the accompanying drawings:

Fig. 2 is another form of self-propelled vehicle having the operating means of the invention differently arranged than in Fig. 1;

Figs. 4 is an enlarged section through the pawl and ratchet mechanism incorporated in the driving means for the vehicle;

Fig. 5 is an enlarged detail of a yoke acting to maintain the rack in engagement with the pinion driving the ratchet and pawl shown in Fig. 4;

Fig. 6 is a detail view showing the footrests carried on the front fork of the form of the invention shown in Fig. 1;

Fig. 7 is a detail view showing the steering arms fitted to the front fork in the form of the invention shown in Figs. 2 and 3; and Fig. 8 is a side elevation showing a modified form of a rack.

Figure 1:
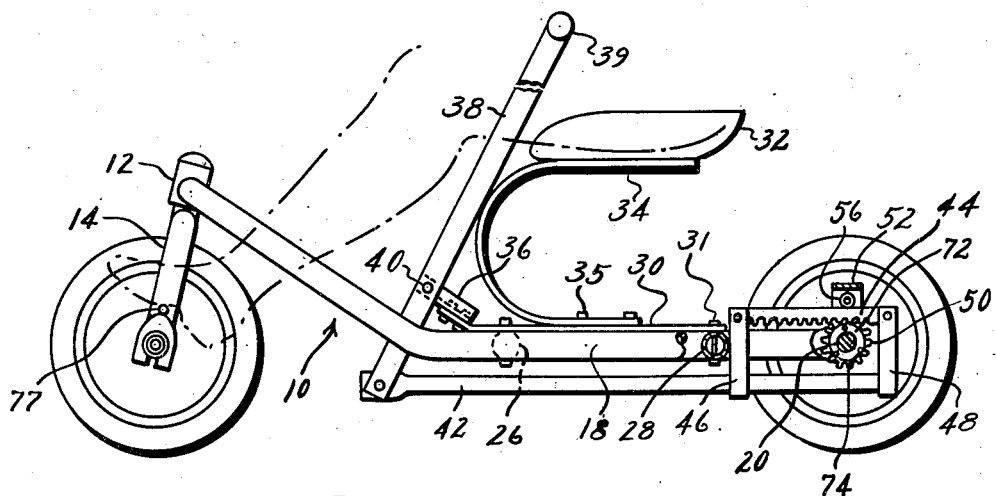
Fig. 1 is a side elevation of one form of self-propelled vehicle incorporating the novel driving mechanism of the invention.

Referring now to the drawings, the numeral 10 indicates a frame provided at the front with a steering head 12 in which is supported a front fork 14 which may be turned in the head, by means later described, to steer the vehicle. The frame comprises two tubular side members 16, 18 bent first downwardly from the steering head and then extending rearwardly substantially parallel with the ground and each being pressed flat at its rearward end to afford journals for a shaft 20 on which a pair of rear wheels 22 and 24 are secured as by means of set screws 25. The side members 16, 18 are connected by a plurality of transverse members 26, 28 to which a longitudinally extending strap 30 may be secured as by bolts 31.

A dished seat 32 of sheet metal or other suitable material is secured to a U-shaped spring 34 mounted on the strap 30, as for instance by bolts 35. The forward end of the strap 30 serves to anchor a bracket 36 which at its forward end supports an upwardly extending operating lever 38 which is pivoted, as indicated at 40, to bracket 36. The lever is thus mounted for swinging movement in the longitudinal plane of the tricycle. A handle bar 39 is secured across the top of the lever 38.

Figure 3:
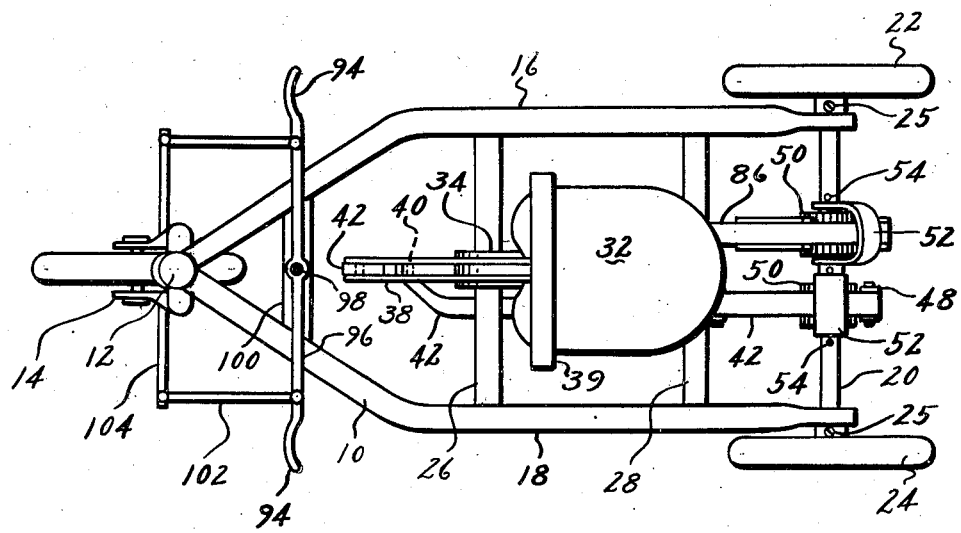
Fig. 3 is a plan view of still another form of self-propelled vehicle combining the operating means of the forms shown in Figs. 1 and 2.

The shaft 20 is rotated through forward and backward movement of the lever 38 by means of a push-pull rod 42 pivoted at its forward end to the lower end of the lever 38 and at its rearward end carrying a rack 44 by means of arms 46, 48. The rack engages a pinion 50 having a ratchet and pawl engagement with the shaft 20; the rack being maintained in engagement with the pinion by means of a yoke 52 which is preferably swingably mounted on the shaft 20 and positioned thereon by pins 54 (Fig. 3).

To provide an anti-friction bearing between the yoke 52 and the rack 44, a roller 56 is carried in the arms of the yoke to rest against the top of the rack.

The ratchet and pawl construction above referred to is shown in Fig. 4. The pinion 50 is machined out to provide a plurality of shoulders or teeth 58, the high point of the teeth being connected by a cam surface running to the root of the next following tooth, in the direction of rotation of the pinion when causing forward movement of the vehicle.

The shaft 20 is provided with a machined slot 60 to receive a pawl 62 which has an easy sliding fit in the slot. The pawl is provided with oppositely directed faces 64, 66, the pawl being backed off to the rear of the engaging surfaces as indicated at 68 and 70. The result of this construction is that when the pinion 50 is rotated in the direction of the arrow in Fig. 4, the pawl will slide downwardly through the slot under the action of gravity and a tooth will engage a face 64 or 66 of the pawl 62, causing rotation of shaft 20. When the pinion 50 is rotated in the opposite direction, the cam surfaces between the teeth 58 will merely cause to and fro movement of the pawl through the slot in the shaft without transmitting any drive to said shaft.

The pinion may be positioned on the shaft 20 by engagement of the high points of the teeth with the shaft, although to retain the pinion in position relative to the pawl I prefer to apply side plates 72 formed to have an easy fit upon the shaft and secured to the pinion by means of flush head screws 74 engaging in threaded bores 76 in the pinion.

A pair of bars 77 are secured to the front fork to serve as footrests and the vehicle is steered by pushing against one or other of these bars.

In the form of tricycle shown in Fig. 2, the lever of Fig. 1 is replaced by a bar 78 furnished with handle bar 80 at its upper end and anchored against movement by a pair of straps 82, 83 extending from the strap 30. Reciprocation of the rack 84 is effected by a bouncing movement of the child in the seat, transmitted through the push-pull rod 86 carrying the rack. The rod 86 is pivoted at 88 to a bracket 90 secured to the seat 92.

In order to enable the occupant to raise his weight on the seat, footrests 94 are provided on the front of the frame, these footrests being formed at the ends of a bar 96 pivoted at 98 to a frame cross member 100 and connected by links 102 to bars 104 extending from the front forks of the tricycle. The remainder of the driving mechanism is identical to that already described to enable the tricycle to be steered by the rider's feet. It will be noted that the yoke 52 will act to maintain proper engagement of the rack and pinion, notwithstanding changes in the slope of rod 86 since the yoke is free to turn on shaft 20.

In Fig. 3 the device is shown combining the driving mechanism of the tricycles shown in Figs. 1 and 2. The steering mechanism is arranged as in Fig. 2, but two driving means are provided. The first driving means comprise the rod 86 pivoted to a bracket secured to the seat, and operating a rack and pinion and driving shaft 20 through ratchet means. The second driving means comprise the pivoted lever 38 operating through the push-pull rod 42, and associated rack and pinion and ratchet mechanism to also drive shaft 20, as shown in Fig. 1. In the form of the invention shown in Fig. 3, the rider can propel the vehicle both by a rowing movement swinging the lever 38 to and fro longitudinally of the tricycle, and also by causing the seat to move up and down by a bouncing movement of the rider in the seat.

In all the various constructional forms of the invention it is to be understood that one rear wheel, while secured on the driving shaft 20 is free to rotate relatively thereto, this result being obtained by furnishing one end of the shaft with a peripheral groove (not shown) into which the end of one set screw 25 projects.

I may also prefer to omit some of the end teeth from one end of the rack as indicated at 44a, in Fig. 8, to enable the tricycle to be freewheeled when desired by moving the rack 44 to its full backward position, thus moving the rack teeth out of engagement with the pinion 50.

I claim:

1. A tricycle type vehicle, comprising: a frame consisting of side members converging at the front end and cross members, a forked member rotatably mounted on the front end of the frame, a front wheel rotatably mounted in the forked member, foot actuated steering means on the forked member, a shaft journalled in the rear end of the frame for rotation about an axis transversely thereof, a rear wheel secured on each end of the shaft, a seat, a U-shaped spring secured at one end to the frame and secured at its other end to the seat, and means for rotating the shaft including a pair of pinions, a pair of ratchet and pawl units operatively connecting the respective pinions to the shaft, a pair of racks, one engaging each pinion, a lever pivotally mounted on the frame, link means operatively connecting the lever to one of the racks, and a link connected at one end to the other rack and connected at its other end to the seat.

2. A vehicle comprising a chassis frame, supporting wheels rotatably mounted on the frame, a U-shaped resilient seat support having one of its legs secured to the frame and having a seat mounted on its other leg, rotatable means operatively connected with at least one of the wheels to drive the same, a ratchet means operatively connected to said rotatable means and a rack member pivotally secured at one end to the seat support adjacent the seat and, at its other end, operatively engaging the ratchet means, whereby movement of the seat support actuates said rack member.

FRANK D. WARBURTON.

REFERENCES CITED

The following references are of record in the file of this patent:

UNITED STATES PATENTS

| Number | Name | Date |
|--------|------|------|
| 355,324 | Kramer | Jan. 4, 1887 |
| 433,202 | Herrick | July 29, 1890 |
| 722,524 | Marqua | Mar. 10, 1903 |
| 1,276,168 | Buchholz | Aug. 20, 1918 |
| 1,309,855 | Johnson | July 15, 1919 |
| 1,443,904 | Parsons | Jan. 30, 1923 |
| 1,767,047 | Burdick | June 24, 1930 |
| 1,887,991 | Sperry | Nov. 15, 1932 |